United States Patent [19]

Stoltenburg

[11] 3,968,739

[45] July 13, 1976

[54] APPARATUS FOR THE PROCESSING OF VINASSE

[75] Inventor: Hans-Martin Stoltenburg, Selk, Germany

[73] Assignee: Kartoffelverwertungsgesellschaft Cordes & Stoltenburg, Schleswig, Germany

[22] Filed: Dec. 23, 1974

[21] Appl. No.: 535,579

Related U.S. Application Data

[62] Division of Ser. No. 459,276, April 9, 1974.

[30] Foreign Application Priority Data

Apr. 13, 1973 Germany............................ 2318751

[52] U.S. Cl................................. 99/276; 426/472
[51] Int. Cl.² .......................................... C12F 3/10
[58] Field of Search ...................... 99/275, 276–277, 99/467, 483, 355; 426/14, 472, 492; 210/152

[56] References Cited

UNITED STATES PATENTS

| | | |
|---|---|---|
| 2,165,950 | 7/1939 | Willkie et al. ...................... 426/472 |
| 2,225,428 | 12/1940 | Christensen ..................... 426/472 X |
| 2,263,608 | 11/1941 | Brown............................. 426/472 X |
| 2,292,769 | 8/1942 | Pattee................................ 426/492 |
| 2,343,706 | 3/1944 | Reich............................ 99/275 UX |
| 2,391,918 | 1/1946 | Pattee................................ 426/472 |
| 2,404,398 | 7/1946 | Pattee................................ 426/472 |
| 2,696,775 | 12/1954 | Dean.................................... 99/355 |
| 3,535,128 | 10/1970 | Willard.......................... 99/483 X |

Primary Examiner—Leonard D. Christian
Assistant Examiner—Arthur O. Henderson
Attorney, Agent, or Firm—Dennison, Dennison, Meserole & Pollack

[57] ABSTRACT

An apparatus is provided for processing and drying vinasse, produced from fermented mash. The mash is crushed, distilled and the resulting vinasse is fractionated in a decanter where the clear liquid is then passed into a three-phase downdraft vaporizer to thicken the liquid. The resulting liquid is then recombined with the solids in a cross-winged mixer where it is then dried.

6 Claims, 1 Drawing Figure

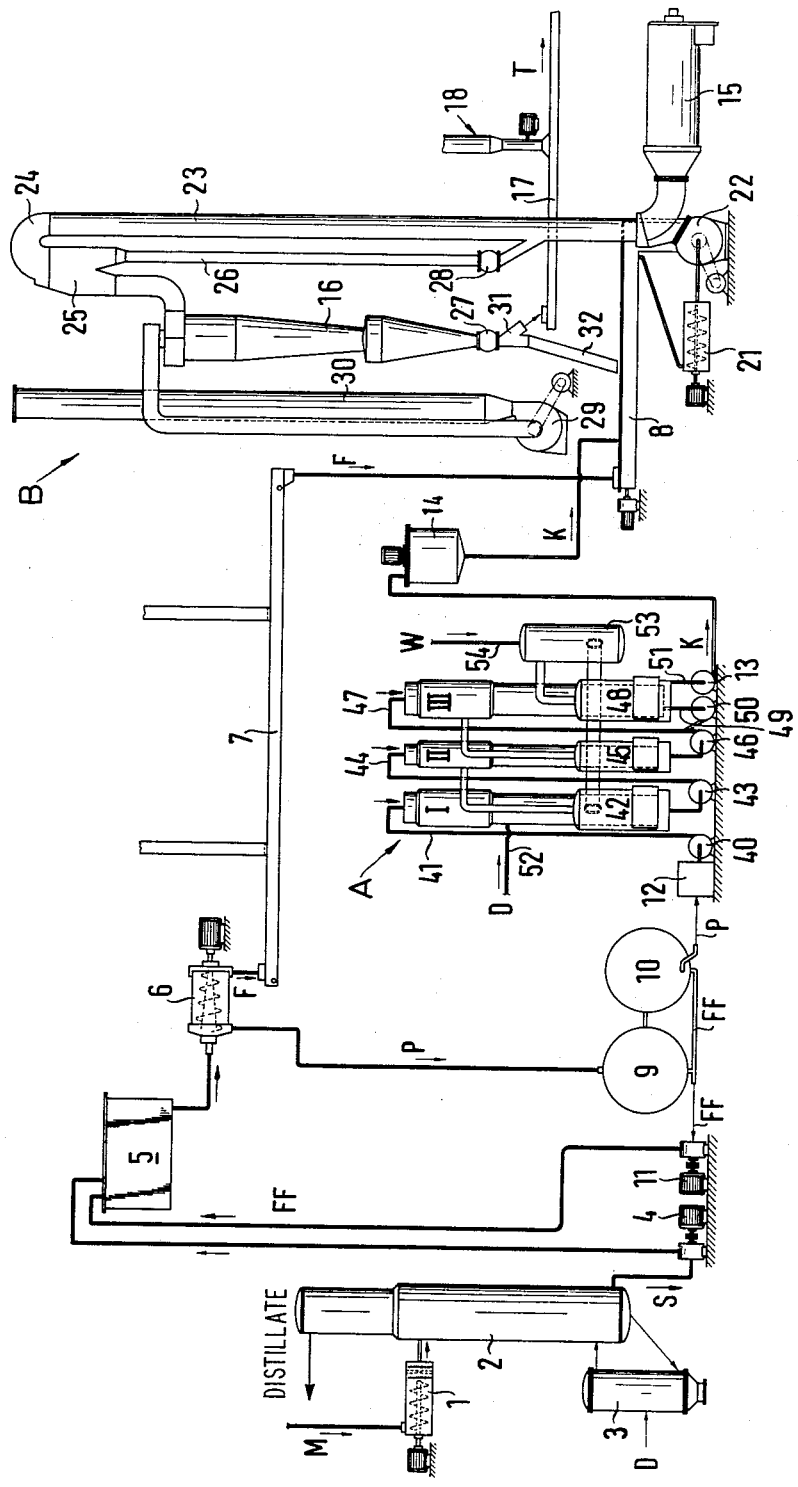

APPARATUS FOR THE PROCESSING OF VINASSE

This is a division of application Ser. No 459,276, filed Apr. 9, 1974.

The invention concerns apparatus for processing of vinasse, especially potato vinasse, in which mash is distilled in an indirectly heated distillation apparatus, following the crushing of the larger solids, and in which all of the distilled vinasse is processed through a drying facility.

When processing agricultural products, primarily potatoes and grain, into spirits, vinasse is generated as a byproduct. Vinasse is known as a valuable feed. But even today it is used almost exclusively in its fresh state in agricultural operations connected with distilleries. Such use causes an absolute dependency of work processes in the distillery upon feasible means of utilizing the vinasse, in its fresh state. Moreover, the utilization of fresh vinasse has the disadvantage of being an impediment to the development of larger distilling units, as related vinasse disposal problems are difficult to solve. Also, from the viewpoint of the agricultural operations associated with the distillery, particularly one involved in the processing of potatoes, it is desirable to prevent storage losses by rapid processing; whereas, on the other hand, vinasse feeds are to be available over a prolonged period of time.

The state of the art knows methods and apparatus by which vinasse is dried; however these have permitted only a partial utilizatin of the vinasse. Most methods in use are based on a division of vinasse into a semisolid and a liquid phase. Solids derived from this process are then dried, having been mixed with other feeds; while the liquid phase, the thin vinasse, must still be ued while still fresh, as heretofore. Hence the old dependency of the distillery upon the utilization of vinasse has not been eliminated.

Further, a method is known in which initially the total vinasse is dried. This process, however, cannot be termed economical in view of current considerations since, in addition to the thickening of the vinasse by indirect heating of the still, the entire volume of residual water, still amounting to 90% of the vinasse, must be removed under atmospheric pressure and thus at high energy consumption rates. This recognized method, too, requires the addition of a potato mash to the so-called thick vinasse prior to drying on rollers.

The object of the present invention is to provide an economical means of drying the vinasse without the addition of any other feeds as agents promoting the drying action.

The invention meets this objective in that the vinasse is fractionated, the clear flow is thickened in a downfall vaporizer, and the solids as well as the concentrate extracted in the downfall vaporizer, are mixed and dried. The advantage gained is a drying process permitting a continual and economical drying of vinasse, particularly potato vinasse.

Another advantageous characteristic of this invention is the fractionation of the vinasse by means of a decanter.

An extension of this invention makes it feasible to provide for a means in which the decanter converts vinasse into clear liquid with a very minimal content of undissolved solids, and solids with high degrees of dehydration.

Another characteristic of this invention is the provision for crushing mash solids before they enter the distillation apparatus. The advantage gained is that the danger of crusting is reduced to a minimum in the heater, and that the danger of clogging is reduced.

Further, realization of this invention causes the clear liquid draining from the decanter to flow through at least one buffer tank prior to entering the downstream vaporizer. Further, it is feasible to, for example, use two buffer tanks rather than one buffer tank, in which arrangement the fine grain solids deposited in the buffer tanks are again placed into the decanter by a pump.

Another characteristic of this invention provides for the thickening of the clear liquid in a multistage or multiple effect downfall vaporizer. The fundamental purpose here is to vaporize large amounts of water from the vinasse in a vacuum process. But potato vinasse, owing to its solid constituents and its pectin-like components strongly resists this very vacuum vaporization; however, this resistance is largely overcome because of the fractionation within the decanter.

Another characteristic of this invention is the mixing of the solids and the concentrate, and the drying of that mixture in a quick drying process which, very advantageously, allows econnomical drying requiring but a minimum of service beyond small basic investment costs.

Further, this invention provides for the movement of the final product on a conveyor facility, in particular a drag-link conveyor, to a silo. In addition to its movement function, this conveyor effects a cooling of the dry mass which leaves the dryer with a temperature of circa 70° to 80°C; a refrigeration system can be used to assist.

The facility using the method based on this invention is arranged in such manner tht the crushing device is coupled with a distillation apparatus, a decanter, a downfall vaporizer, a cross-winged mixer, a rapid dryer, and a drag-link conveyor.

Further, in this invention, the heater of the distillation apparatus is installed at the facility's exterior. Thus an advantage accrues in that the heater's pipes, which tend to become encrusted easily especially in the processing of potato mash, are readily accessible for cleaning by opening the swivel-mounted heater cover.

Another characteristic of the invention is the insertion of at least one intermediate container in between the distilling apparatus and the decanter, and in between the downfall vaporizer and the cross-winged mixer. This results in another advantage, viz, for example, that the facility can continue to be operated even during necessary cleaning of individual components.

Still another characteristic of the invention is the use of control devices to regulate the automatic operations of individual components. The ensuring advantage is that the entire drying facility largely operates in an automatic mode. Safety devices cause prompt shut-off so that in the event of failure of any component the feeding of vinasse is halted immediately, preventing the clogging of the dryer.

This invention is hereinafter depicted by means of a drawing showing a schematic example of an installation using this method. For the sake of clarity, the following terms are used:

D = steam
M = mash
F = solids
FF = fine grain solids, sediments

W = cooling water
S = vinasse
K = concentrate
T = dried mass
P = clear liquid clear phase As is seen in the drawing, the facility for executing the invented design for the drying of vinasse consists, essentially, of a crusher 1, distillation apparatus 2, decanter 6, multi-phase downfall vaporizer A, cross-winged mixer 8, and rapid drying facility B to which is coupled a drag-link conveyor 17. In between distillation apparaus 2 and decanter 6, there is an intermediate container 5. Further in between decanter 6 and downfall vaporizer A there is buffer tank 9 to which is coupled another buffer tank 10. Still another intermediate container 14 is located in between multi-phase downfall vaporizer A and cross-winged mixer 8.

The facility based on this invention operates as follows: Fermented mash M, coming from the fermentation vats, is fed into crusher 1 which in its mode of operation compares with a malt mincer. The crusher's perforated discs and knives cause all rough grained components of the mash, such as potato peels, straw particles, malt grain solids, etc. to be reduced in size to a large extent. Thusly, processed mash is then passed on to distillation apparatus 2.

Distillation apparatus 2 is equipped with a so-called indirect heating system which prevents the mixing of the steam condensate with the vinasse. Heater 3, for indirect heating, is installed adjacent to the distillation apparatus. Thus there is the advantage that the heater's pipes, which tend to easily become encrusted especially in the processing of potato mash, are readily accessible for cleaning, by opening the swivel-mounted heater cover.

In order to reduce the danger of crusting to a minimum and to prevent subsequent clogging, crusher 1 for rough grained components of mash is installed ahead of the distillation apparatus. Service life of heater 3 in continuous distillation operation without prior crushing is about 24 hours, while it amounts to circa one week with prior crushing.

Vinasse S, now at a temperature of circa +100°C leaves distillation apparatus 2 as a bottom residue and is fed by pump 4 into intermediate container 5. Intermediate container 5 is mounted at such height as permits the flow of the substance being processed without additional pumps. From intermediate container 5 the vinasse reaches decanter 6 via a proportioning device (perforated disc).

The construction of decanter 6 with regard to the differential revolution of its internal discharge worm gear and its internal control disc, which determine the degree of fill of the decanter drum, is such that an unobjectionable clear flow with a very minor proportion of still undissolved sedimentary fine grain solids is produced, with a high degree of water removal (25% dry substance) characterizing the solid phase being discharged simultaneously. Extracted solids F are carried away from decanter 6 by conveyor belt 7 which is fully enclosed but equipped with ventilators to carry off the vapors. Solids F reach cross-winged mixer 8 from conveyor belt 7.

Clear phase P exiting from decanter 6 runs, free-fall, into buffer tank 9. This buffer tank 9 is situated adjacent to another buffer tank 10 and ahead of three-phase vaporizer A. Buffer tanks 9 and 10 are interconnected at one-half their height, with a connecting pipe through which clear phase P reaches the second tank 10. The purpose of this coupling is to enable undissolved fine grained solids still contained in the clear flow to settle on the bottom, particularly in the first tank 9. Thusly produced sediments FF are returned, periodically, by pump 11, to intermediate container 5, and they thus again enter decanter 6. Sediments FF are also removed, by the same pump, from tank 10, as needed.

Clear phase P travels from the second tank 10 into a float container 12 of a three-phase downfall vaporizer A. This vaporizer thickens the clear phase P at a ratio of from 1 to 10, to 1 to 12. This substantial degree of thickening and the resulting reduction in volume require that the product be directed repeatedly toward heater III in order to assure proper covering of the pipe surfaces at all times so as to prevent crusting and to fully utilized the heater area. This additional feed into the bottom of heater III is accomplished by a special circulating pump 50. This coupling, in connection with the excellent purification of clear flow P, permit the production of a thin-liquid concentrate K with 50% dry components.

Thus, clear phase P travels as follows: float container 12, pump 40, pipe 41, heater I, separator 42, pump 43, pipe 44, heater II, separator 45, pump 46, pipe 47, heater III, pipe 49 from the bottom of heater III via pump 50 in pipe 47, and thence again in heater III (multiple circulation), separator 48, pipe 51 via pump 13 in container 14. Heater I receives steam D via pipe 52. Vapors from separator 48 are condensed in cooler 53 by cooling water W received via pipe 54.

Concentrate K being discharged from facility A thusly is moved by pump 13 to intermediate container 14 which is situated above cross-winged mixer 8, and to rapid dryer B.

The aforementioned rapid dryer B is used for final drying because it dries the product without degrading it and further because it requires but a minimum of human attention. Investments costs, too, are within reasonable limits.

Both phases, solids F from the decanter 6 and concentrate K from the vaporizer A, are processed in cross-winged mixer 8, while some already dried material withdrawn from separator 16 is added continually, in such a manner that the resulting mixture travels via a proportioning screw 21 and a centrifugal feeder 22 into the hot air stream produced in burn chamber 15, to be carried without difficulty through the drying system.

Hence, phases F and K proceed as follows: cross-winged mixer 8, proportioning screw 21, centrifugal feeder 22, drying tube 23, baffle 24, division 25 with dry material in separator 16 and semidry material by return 26 into drying tube 23. Enclosed works 27 and 28 couple to separator 16 and return 26 so as to complete the drying system.

Vapor-laden air separated in separator 16 is withdrawn by ventilator 29 and discharged into the open via chimney 30. The dried product is withdrawn behind separator 16 from enclosed works 27. A part reenters cross-winged mixer 8 via pipeline 32 while the other part is fed via pipe line 31 to conveyor 17.

In addition to its moving function, conveyor 17 causes a cooling of dry mass T which leaves dryer B with a temperature of 70° to 80°C. Cooling is accomplished without other assistance if conveyor 17 is of sufficient length, or a refrigerator 18 may be employed.

The entire drying facility is operated automatically. Safety devices cause prompt shut-off in the event of failure of any component so that the feeding of vinasse is halted immediately; clogging of the dryer is quite impossible. Vaporizer A, too, is designed in such manner that, if the clear phase fails, it switches automatically to vapor condensates. This vapor condensate is taken from heaters I and II. This prevents an undesirable dry operation of pipes in the heaters.

The size of intermediate containers is designed to permit vaporizer A to continue to operate for hours after decanter 6 or rapid dryer B have ceased operation, and, conversely, decanter 6 and rapid dryer B can operate without interference during periods in which vaporizer A is being cleaned.

I claim:
1. Apparatus for processing vinasse comprising:
    a. means for crushing large solids of a fermented mash whereby the dangers of heat crusting and clogging are reduced to a minimum;
    b. means for distilling the crushed solids to obtain a bottoms residue of vinasse;
    c. means for indirect heating of the distilling means;
    d. decanting means for fractionating the vinasse to simultaneously convert the vinasse into clear liquid with a very minimal content of undissolved fine grained solids, and solids with a high degree of dehydration, and removing the solids therefrom;
    e. means for exiting the clear fractionated liquid from the decanter;
    f. buffer tank means for receiving free-fall the clear fractionated liquid from the decanter, and separating sediment therefrom;
    g. means for recycling the aforesaid sediment to the decanter;
    h. multiple effect vacuum downfall vaporizing means to thicken the clear fractionated liquid, and form a concentrate thereof;
    i. means for conveying the fractionated solids from the decanting means to a mixing means;
    j. means for intermixing said concentrate with said solids;
    k. means for drying the mixed concentrate and solids by a two-stage hot-air drying means;
    l. means for separating said solids from the mixer, and returning a portion thereof for further mixing.
2. Apparaus as defined in claim 1 wherein said mixer is a cross-winged mixer.
3. Apparatus as defined in claim 1 and further including means for removing sediment in the buffer tank and feeding the same into the decanter.
4. Apparatus as defined in claim 1 and further including a refrigerated conveyor for moving the dried mixture from the mixer and drying means.
5. Apparatus as defined in claim 1 and further including at least one buffer tank through which the clear liquid with a very minimal content of undissolved solids passes between the decanting means and multiple-effect vacuum downfall vaporizing means.
6. Apparatus as defined in claim 1 wherein the multiple-effect vaporizing means has three phases.

* * * * *